United States Patent [19]

Danielson et al.

[11] Patent Number: 5,327,055
[45] Date of Patent: Jul. 5, 1994

[54] MECHANICAL BRAKE HOLD CIRCUIT FOR AN ELECTRIC MOTOR

[75] Inventors: Craig T. Danielson; Michael P. McIntosh; Hector E. Mery, all of Tucson, Ariz.

[73] Assignee: International Business Machines Corporation, Armonk, N.Y.

[21] Appl. No.: 28,074

[22] Filed: Mar. 8, 1993

[51] Int. Cl.$^5$ .............................................. H02P 3/04
[52] U.S. Cl. ....................................... 318/366; 318/370
[58] Field of Search ................. 318/370, 371, 366–372

[56] References Cited

U.S. PATENT DOCUMENTS

| | | | |
|---|---|---|---|
| 2,421,187 | 5/1947 | Derungs | 188/158 |
| 3,136,938 | 6/1964 | Grepe et al. | 318/209 |
| 3,466,524 | 9/1969 | Cooper | 318/363 |
| 3,486,097 | 5/1967 | Shekro | 318/203 |
| 4,095,680 | 6/1978 | Vogelsang | 188/156 |
| 4,223,855 | 9/1980 | Briedis | 242/204 |
| 4,278,298 | 7/1989 | Sauka et al. | 303/3 |
| 4,494,058 | 6/1985 | Berti | 318/372 |
| 4,931,711 | 6/1990 | Naruo | 318/568 |
| 5,070,290 | 12/1991 | Iwasa | 318/758 |

Primary Examiner—William M. Shoop, Jr.
Assistant Examiner—Brian Sircus
Attorney, Agent, or Firm—M. W. Schecter

[57] ABSTRACT

An automated tape library employing a motorized robotic picker wherein the electric motor driving the robotic picker is equipped with two brakes that act simultaneously. The first is a mechanical brake which uses a spring to push a fixed brake pad against the rotating motor. During normal motor operation, an electric solenoid is used to overcome the spring and disengage the brake pad from the motor. When the robotic picker is to be mechanically stopped, the solenoid voltage is turned off and the solenoid releases the spring placing the brake pad in contact with the motor. The second brake is a dynamic electrical brake which makes use of the back emf of the motor to drive a current back into its own windings such that the motor decelerates. The circuit further prevents mechanical brake engagement even at lower motor speeds when back emf is relatively low but robot speed is fast enough to cause mechanical damage if stopped via the mechanical brake.

15 Claims, 4 Drawing Sheets

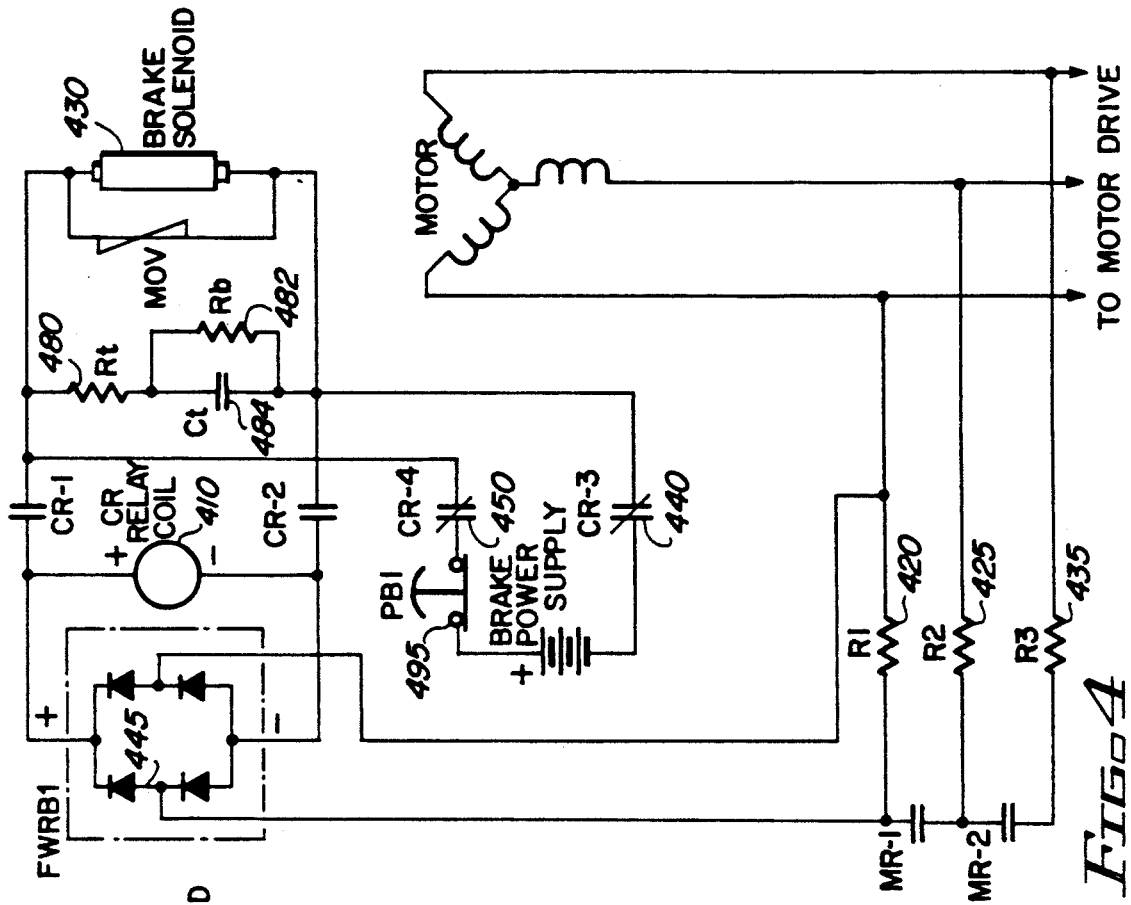
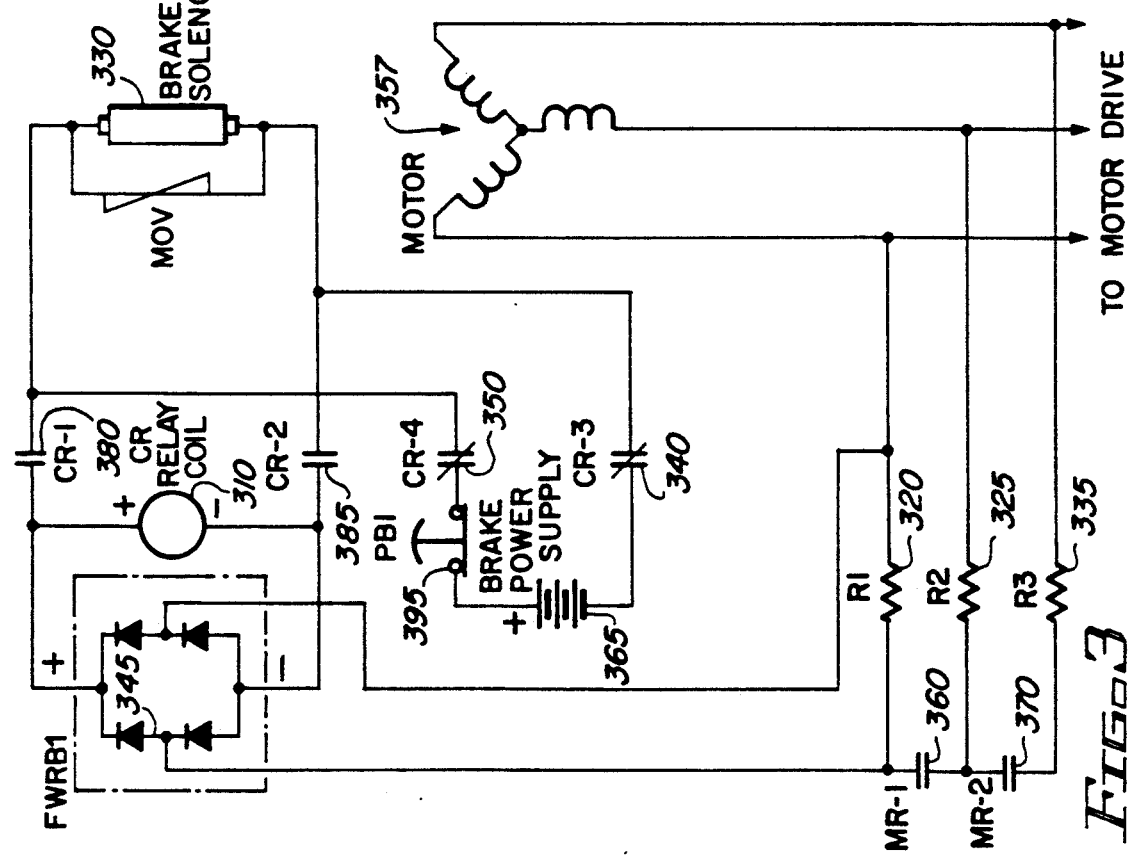

MECHANICAL BRAKE HOLD CIRCUIT FOR AN ELECTRIC MOTOR

BACKGROUND OF THE INVENTION

1. Field of the Invention

The present invention relates generally to automated storage libraries and specifically to a method and apparatus for slowing and stopping a robotic picker associated with such a library.

2. Description of the Prior Art

Many business and technical applications require very large databases for storing information used in connection with the applications. Database storage requirements can exceed hundreds or thousands of gigabytes of data. Often these storage requirements can not be met by disk drive storage due to cost and/or physical space limitations. Data storage for such large databases are typically stored on magnetic tape which provides the lowest storage cost per unit of data.

Tape storage, however, generally requires the longest access time among existing technologies for retrieving tile stored data. There are two primary reasons for this. First, once a tape is loaded into a tape drive, accessing the data stored on the tape is substantially slower than accessing data stored on devices such as a direct access storage device (DASD) or an optical disk. This is primarily due to the respective transport speeds of the data containing medium as well as the bandwidth attainable by the read heads present in the respective storage devices. Secondly, the time require to locate the desired tape and transport it to the tape drive for loading can bring about substantial delays. Depending on the size of the database, the totality of data can often be stored on DASD devices which do not require transport back and forth to the read head as with tape libraries.

Early magnetic tape databases required an operator, when prompted, to retrieve a tape from a shelf and load the tape into a tape drive. This procedure was not only time consuming but was also prone to human operator errors. Automated storage libraries such as that disclosed in U.S Pat. No. 5,015,139 have been developed to overcome the delays associated with loading and unloading tapes. In addition, automated storage libraries eliminate the above described human operator errors associated with handling the tapes.

The ability to place larger amounts of data on tape has derived principally from two technological advancements. First, actual cartridge size has been diminished as a result of various mechanical advances. Secondly, media properties have been improved to store more data on a given area of tape. Data can currently be written to eighteen tracks or more. It can be thus be seen that with the improvements in physical size and media technologies that have taken place over the years, it has become possible to pack more and more data into a smaller and smaller storage element such a tape cartridge. These advances in magnetic tape technology have made automated tape libraries more appealing in recent years.

Access time and reliability is improved in an automated tape library by automatically managing the storage and retrieval of tape cartridges. Operational benefits of using an automated tape library include greater reliability in tape cartridge mounts, better predictability in request-to-mount time and improved off-shift availability. Automated tape libraries include a large number of storage slots for storing library resident tape cartridges as well as one or more tape drives connected to the data processing system. They also include a robotic picker mechanism. In some cases an input/output port is provided to allow for the insertion and removal of cartridges to and from the library. The robotic picker operates on command from tile processing system to transfer a tape cartridge between a storage slot and a tape drive within seconds. In some cases it may also move a cartridge froth one storage slot to another.

The robotic picker typically includes either a picker or a robotic arm having a vision system and a gripper system. The vision system can view a label or bar code attached to a tape cartridge in order to identify the correct cartridge to be picked. The vision system may also provide feedback to the gripper system so that the gripper system can move to the correct position in order to pick the designated tape cartridge. It will be understood by one of ordinary skill in this art that such a robotic picker can be configured to access and transport a variety of data elements, tape cartridges being only one such element. As such, it will be realized that the novel aspects of this invention can be applied in any sort of automated storage library, the automated tape library being only one possible application.

In the automated tape library, the robotic picker is moved through long distances on a track which establishes a path of conveyance between the tape cartridge library and one or more tape drive units. The robotic picker is driven by a large electric motor. To accomplish the required movement, the electric motor is used to drive a gear transmission which in turn drives a metal pinion gear against a plastic coated rack gear. During normal usage, the acceleration and deceleration of the motor is controlled by an AC servo motor controller. In the event of a power failure or emergency situation, the motor may also be stopped through the use of a mechanical brake that engages automatically to stop the rotation of the motor. The translational motion of the robotic picker is stopped by forces acting between the moving pinion gear and the stationary rack.

If the combination of braking forces applied to the motor are too strong, the forces between the pinion and rack become so high that gear teeth in the rack can be broken or damaged. In the case of an emergency stop it is very important to bring the robotic picker to a complete stop in as short a time period as possible. It is, however, unacceptable to provide this feature at the cost of broken teeth.

A robotic picker and braking circuit for significantly reducing the damage which can be caused by emergency stops and/or power failures is described in a copending, commonly assigned United States Patent application bearing an IBM internal docket number of TU9-93-002. That application was filed on the same day as the subject application. In the following discussion, the TU9-93-002 circuit will be referred to as the "DBU1" (dynamic braking unit) circuit. The DBU1 circuit, while providing controlled braking in most situations, does, however, suffer from some drawbacks. There are a number of circuit properties inherent in the DBU1 circuit that can cause mechanical braking to occur at speeds that are high enough to result in damage to the robotic picker and its related components.

SUMMARY OF THE INVENTION

Accordingly, it is an object of the present invention to provide an improved method and apparatus for storing and retrieving large amounts of data.

It is a further object of this invention to provide an automated storage library which includes a robotic picker for accessing a selected data element and loading it into a drive.

It is a still further object of this invention to provide an automated storage library employing a robotic picker that can be quickly slowed down and/or stopped.

It is a yet further object of this invention to provide the ability to stop and/or slow the robotic picker without causing damage to the rack and pinion system on which the robotic picker rides.

It is a still further object of this invention to provide controlled braking such that mechanical braking is never employed at speed which can result in damage to the robotic picker or related drive components.

In the automated tape library of this invention, the electric motor driving tim robotic picker is equipped with two brakes that act simultaneously. The first is a mechanical brake which uses a spring to push a fixed brake pad against the rotating motor. During normal motor operation, an electric solenoid is used to overcome the spring and disengage the brake pad from the motor. When the robotic picker is to be mechanically stopped, the solenoid voltage is turned off and the solenoid releases the spring placing the brake pad in contact with the motor. The second brake is a dynamic electrical brake which makes use of the back emf, or generator action, of the motor to drive a current back into its own windings such that the motor decelerates.

The dynamic electrical braking force diminishes as the motor speed drops and can be precisely controlled by placing resistors in series with the motor windings. The mechanical braking force is controlled by the spring force and the state of wear of the brake pad. In practice, mechanical braking forces can vary widely and often is so high that it causes damage to the gear teeth when the brakes are applied to a robotic picker moving at or close to full speed.

It is important to note, however, that it is not possible to simply use dynamic braking in all situations. This is because at slow speeds or in a stationary position, there is little or no back emf to drive the dynamic electrical brake. As a result, at these speeds, the mechanical brake must be used.

According to the invention, fast braking without damage to the drive system is accomplished by supplying part of the motor back-emf energy to the mechanical brake solenoid, which in turn prevents the mechanical brake from engaging while the robotic picker is moving at high speeds. In this way, only the well controlled and relatively gentle dynamic braking force is used to slow down the robotic picker and, thus, damage to the gear teeth is prevented. When the motor speed drops sufficiently, the back-emf is no longer high enough to provide much braking action or hold the mechanical brake solenoid. At this point the mechanical brake is engaged and completes the task of halting robotic picker movement. Further, the engagement of the mechanical brake holds the robotic picker firmly in the stopped position.

BRIEF DESCRIPTION OF S DRAWINGS

The above and further objects, features and advantages of the present invention will become more apparent from the following detailed description taken in conjunction with the accompanying drawings, wherein:

FIG. 3 is a schematic diagram illustrating the DBU1 circuit upon which the improvement of this invention is based;

FIG. 4 is a schematic diagram illustrating the DBU2 circuit representing the first embodiment of the invention herein;

DESCRIPTION OF THE PREFERRED EMBODIMENTS OF THE INVENTION

For purposes of illustration, the invention is described in the context of an automated tape library such as the IBM 3495 Tape Library Dataserver. However, the subsequent teachings could be applied in any number of other applications where there exists a need to stop a robot in a controlled manner.

Figure 1:
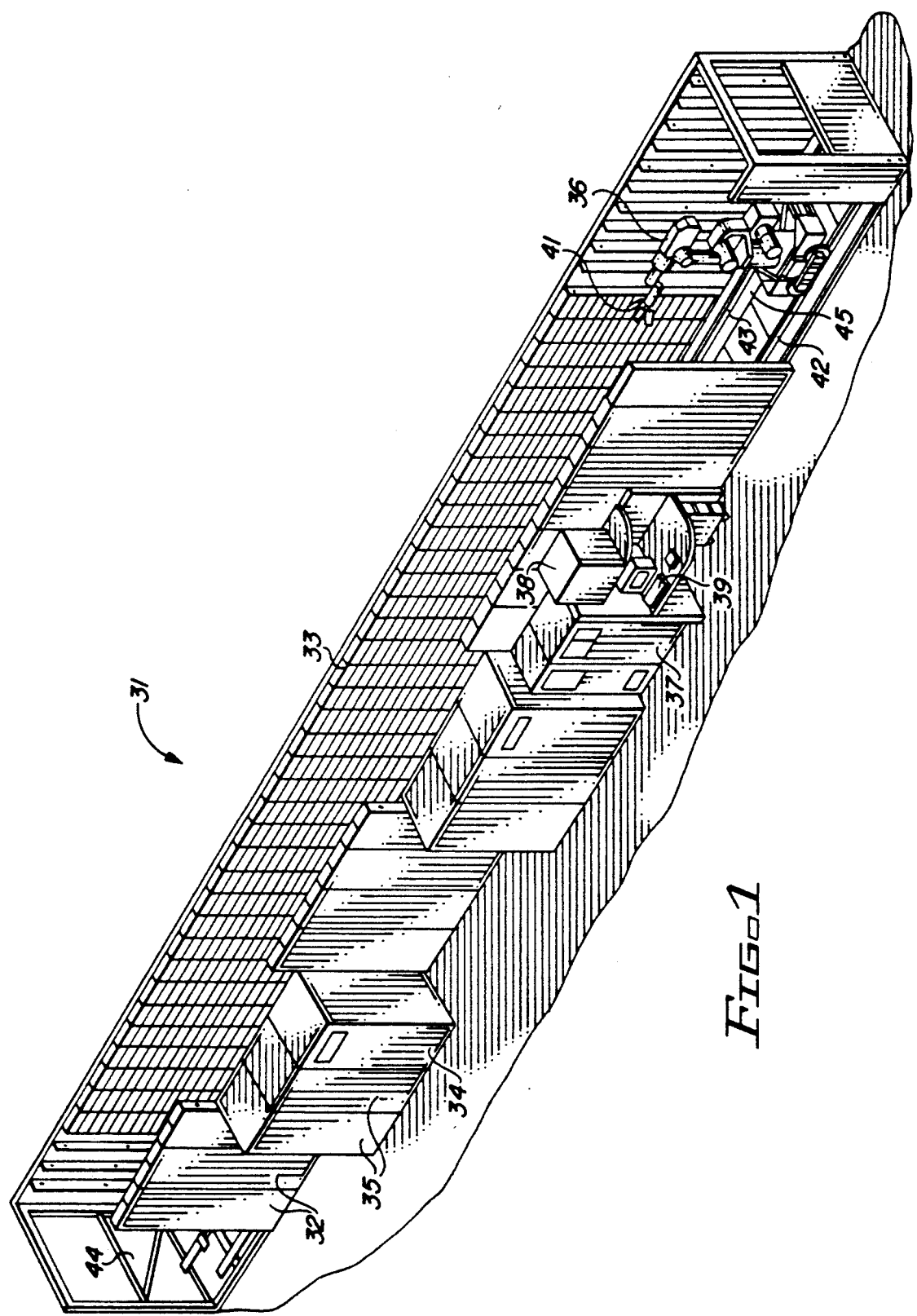
FIG. 1 is a perspective view of the automated tape library which embodies the preferred embodiment of the invention described herein.

Referring now to FIG. 1, the IBM 3495 automated tape library is shown in perspective view. The automated tape library 31 is able to manage a very large database by storing data on a large number of magnetic tapes. Each magnetic tape is housed in a plastic cartridge for protecting the magnetic tape and providing a convenient handling mechanism for a robotic picker. The automatic tape library 31 includes a plurality of modules 32, wherein each module is made from a plurality of magazine holders (not shown). Each magazine holder consists of a plurality of storage slots 33, with each storage slot being capable of storing a magnetic tape cartridge therein.

The automatic tape library 31 also includes at least one tape unit, for example, an IBM 3490 Magnetic Tape Subsystem having a controller 34 and tape drives 35. A robotic picker 36, having a gripper/vision assembly 41 attached thereto, travels on an outrigger rail 42 and a guide rail 45 to transfer tape cartridges between the storage slots 33 and the tape drives 35. The robotic picker 36 is capable of human-like motions. A example of a robot suitable for the purposes described herein is the Model GMF S-10 robot, manufactured by Fanuc, Ltd.

A robotic picker controller 37, attached to the automatic cartridge library 31, commands the robot 36. A service bay 43, for the robot 36, is located at one end of the automated tape library 31. The service bay 43 functions as a parking space for the robot 36 when it is not in use or when it is being serviced. An operator access bay 44 is provided at the other end of the automated tape library 31 in order to allow service personnel to enter the chamber. A remote terminal bay 38, accessible internally by a service person, is attached to the automated tap library 31. Library management is available through a personal computer 39. The personal computer 39 allows an operator to determine system status, promote a tape cartridge mount status or to generally enter instructions to the automated tape library 31.

Figure 2:
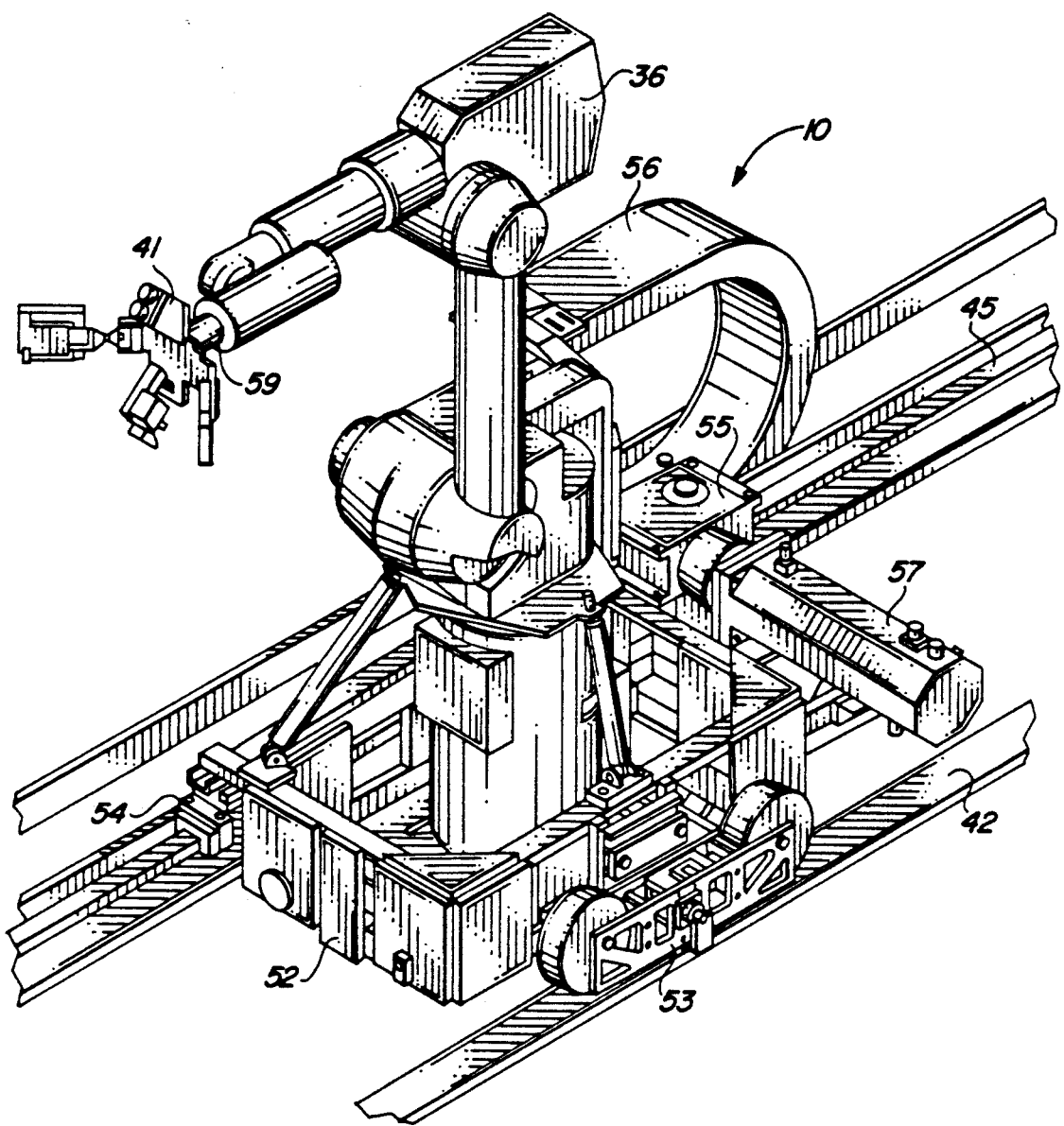
FIG. 2 is a detailed view of a robotic picker used in the automated tape library of FIG. 1.

FIG. 2 shows the robot 36 in greater detail. The robot 36 is supported by an outrigger assembly 53 which includes two wheels for riding on tile outrigger rail 42. The outrigger rail 42 provides no guidance or control; it merely supports the robot 36. A linear bearing assembly 54 includes a drive pinion which engages teeth on a gear rack (not shown) below the guide rail 45 for guiding the robot 36. A servo motor 57 provides the drive necessary to move the robot 36 along the guide rail 45. The Model 30S-3000 AC servo motor manufactured by Fanuc, Ltd. is a suitable model for the embodiment of the invention described herein. It should be noted, however, that various motor configurations could just as easily be embodied in the subject invention.

The servo motor 57 does not drive the robot 36 directly, but instead the servo motor 57 is connected to a reducer 55. The reducer 55 is a right angle gear box for reducing the speed and changing the axis of the servo motor 57. The reducer 55 increases the servo motor 57 torque for moving the robot 36. Textron manufactures a Model SMV-25 reducer that provides the necessary functions.

The position of robotic picker 36 may be accurately tracked by an optical encoder (not shown). The gripper/vision assembly 41 is shown attached to an end of an arm 59 of the robot 36. The arm 59 rotates to turn the gripper/vision assembly 41 to different positions. Power and signal lines are connected to the robot 36 via a cable chain 56. The cable chain 56 provides protection for the cables and is flexible to allow the cables to follow the robot 36.

The robot 36 may be stopped in the event of a power failure or in the event of an emergency stop situation. An emergency stop situation occurs when an emergency stop button is depressed by a human operator in the event of a dangerous or unexpected situation. When the emergency stop button is depressed, all power is immediately blocked from reaching the robotic picker 36. While the following discussion addresses a single emergency stop button, it will be recognized that there could exist a plurality of such stop buttons with a minimal amount of modification and that such modification would be within the spirit and scope of this invention.

Turning now to FIG. 3, the function of the DBU1 circuit will discussed. It can be seen that normal motor operation (i.e. in tile absence of braking or emergency stop) is maintained in this circuit by energizing the mechanical brake solenoid 330 so as to retract the associated mechanical brake ( not shown ). The mechanical brake operates by pushing a fixed brake pad against the rotating motor 357. The position of the brake pad is determined by an attached spring which is positioned according to the state of the mechanical brake solenoid 330. The dynamic braking action is not active during normal motor operation since there is no current path through the dynamic brake resistors 320, 325 and 335.

A constant voltage is supplied to mechanical brake solenoid 330 so that the mechanical brake pad (not shown) is not engaged and no mechanical braking force is generated. The voltage is supplied through the normally closed contact poles $CR_3$ 340 and $CR_4$ 350 of relay CR 310. Also, during normal motor operation, motor relay MR (coil not shown) is energized so that relay contacts $MR_1$ 360 and $MR_2$ 370 are open.

When an emergency stop condition occurs such as in the case when push bottom 395 is depressed, motor relay MR deenergizes and contacts $MR_1$ 360 and $MR_2$ 370 close so that the motor windings are shorted through dynamic brake resistors $R_1$ 320, $R_2$ 325 and $R_3$ 335. The AC current flowing through the brake restores produces a voltage across all three resistors. The voltage across $R_1$ 320 is tapped with rectifier bridge 345. The rectified output voltage is supplied to the coil of control relay CR 310 and to the pair of normally open contacts $CR_1$ 380 and $CR_2$ 385.

This causes contacts $CR_1$ 380 and $CR_2$ 385 to close which in turn supplies the rectified voltager to mechanical brake solenoid 330, thus preventing it from collapsing and engaging the mechanical brake. Furthermore, as control relay CR 310 energizes, the connection to the normal brake controls is broken because normally closed contacts $CR_3$ 340 and $CR_4$ 350 are opened.

As the motor decelerates, the current through the windings drops and eventually the voltage across $R_1$ 320 will no longer be sufficient to hold mechanical brake solenoid 320 and/or control relay CR 310 open. In either case, mechanical brake solenoid 330 will collapses and the mechanical brake will engage, bringing the motor to a complete stop. At this time there is no current in the windings and no voltage across $R_1$ 320. This causes control relay CR 310 to be forced into its de-energized state. As a result, control of mechanical brake solenoid 330 is returned to the normal mechanical brake circuit, motor rotation is halted and the robot is locked in the stationary position.

While the DBU1 circuit prevents the mechanical brake from engaging during most situations when the speed of the robotic picker 10 is high enough to cause damage, there are specific instances where the dynamic brake could engage at a damaging speed. These instances can occur due to three particular shortcomings of the DBU1 circuit.

The DBU1 circuit contains a relay that is energized by the back-emf of the motor during dynamic braking. As the motor slows down, the amplitude of the back-emf drops and eventually the voltage is too small to hold the relay coil and/or the motor brake solenoid in the energized state. When either of these components de-energizes, the mechanical brake is applied immediately and damage could result.

One problem with the DBU1 circuit is that the brake solenoid will de-energize at motor speeds that are high enough to put severe stress on the robotic picker drive components. This problem is generally due to the fact that at lower speeds (which are still high enough to cause damage) there may not be enough back-emf coming from the motor to maintain the mechanical brake solenoid from releasing the mechanical brake.

A second problem with the DBU1 circuit is that it fails to address the de-energizing of the mechanical brake solenoid that occurs immediately after the normal brake voltage is removed but before the dynamic brake action can be implemented to re-energize the mechanical brake solenoid. During this transition interval, the lack of current supplied to the solenoid may be for a period of time enough to engage the mechanical brake. Often this occurs at speeds high enough to result in damage to the robotic picker drive components.

The motor employed in the preferred embodiment of both the DBU1 circuit as well as the circuit of this invention includes a metal-oxide varistor (MOV) across the brake solenoid. This causes the solenoid current to dissipate very quickly when brake voltage is removed. The MOV works well in most general purpose applications, for which a quick stop is required. However, in the application representing the preferred embodiment of this invention, an automated tape library, the rapid onset of braking caused by the MOV can result in system damage.

The final problem with the DBU1 circuit is that it is possible to connect the normal brake solenoid power supply in the opposite polarity from the voltage that is provided by the rectified back-emf of the motor during an emergency stop. If this occurs, the current in the mechanical brake solenoid must change direction as the circuit goes from the normal operating mode to the dynamic braking mode. Such a current reversal will delay the transition between the normal energized state of the solenoid and the dynamically held energized state. When the dynamic brake voltage is applied to the brake it must overcome both the inductance of the solenoid and the residual magnetism in its iron core before the solenoid is re-energized and the mechanical brake is released.

These transitions take additional time and the high mechanical brake forces that will occur during this time increase the risk that the system will be damaged.

Turning now to FIG. 4, the circuit (referred to herein as the DBU2 circuit) of the current invention in its first embodiment is described. The circuit improves upon the DBU1 circuit by adding a capacitor $C_t$ 484 and two resistors $R_b$ 482 and $R_t$ 480. In this circuit $C_t$ 484 charges through $R_t$ 480 when the normal brake power supply 465 turns on. When an emergency stop occurs and the normal brake power is cut off, $C_t$ 484 is discharged through $R_t$ 480 and the brake solenoid 430. The resulting current in the brake solenoid 430 keeps it from collapsing and de-energization during the transition period from power supply energization to back-emf energization is eliminated.

In addition, although the dynamic brake holdoff portion of the circuit works as it does in the DBU1 circuit, the addition of the $R_t$ 480 / $C_t$ 484 filter provides a time constant to delay the discharge of the current in the brake solenoid 430. This, in turn, acts to prevent mechanical brake engagement at lower speeds which are high enough to cause system damage.

It should also be noted that $R_b$ 482 is a bleed off resistor placed in parallel with $C_t$ 484. This resistor serves to slowly discharge $C_t$ 484 when the system is powered off. It is only required primarily for the protection of service personnel. Component values for the DBU2 circuit that provide satisfactory performance in the above-described automated tape library application are $C_t=470$ μF, $R_t=100$ ohms and $R_b=10K$ Ohms.

As can be seen, the DBU2 circuit eliminates the first and second problems described above. It does not address the third problem. Thus, the DBU2 circuit prevents the mechanical brake from engaging due to low motor back-emf at lower motor speeds. Moreover, the DBU2 circuit effectively handles the transition period that occurs between the time that the brake power supply 465 voltage energizes the mechanical brake solenoid 430 to the time that the motor back-emf energizes the mechanical brake solenoid 430.

Figure 5:
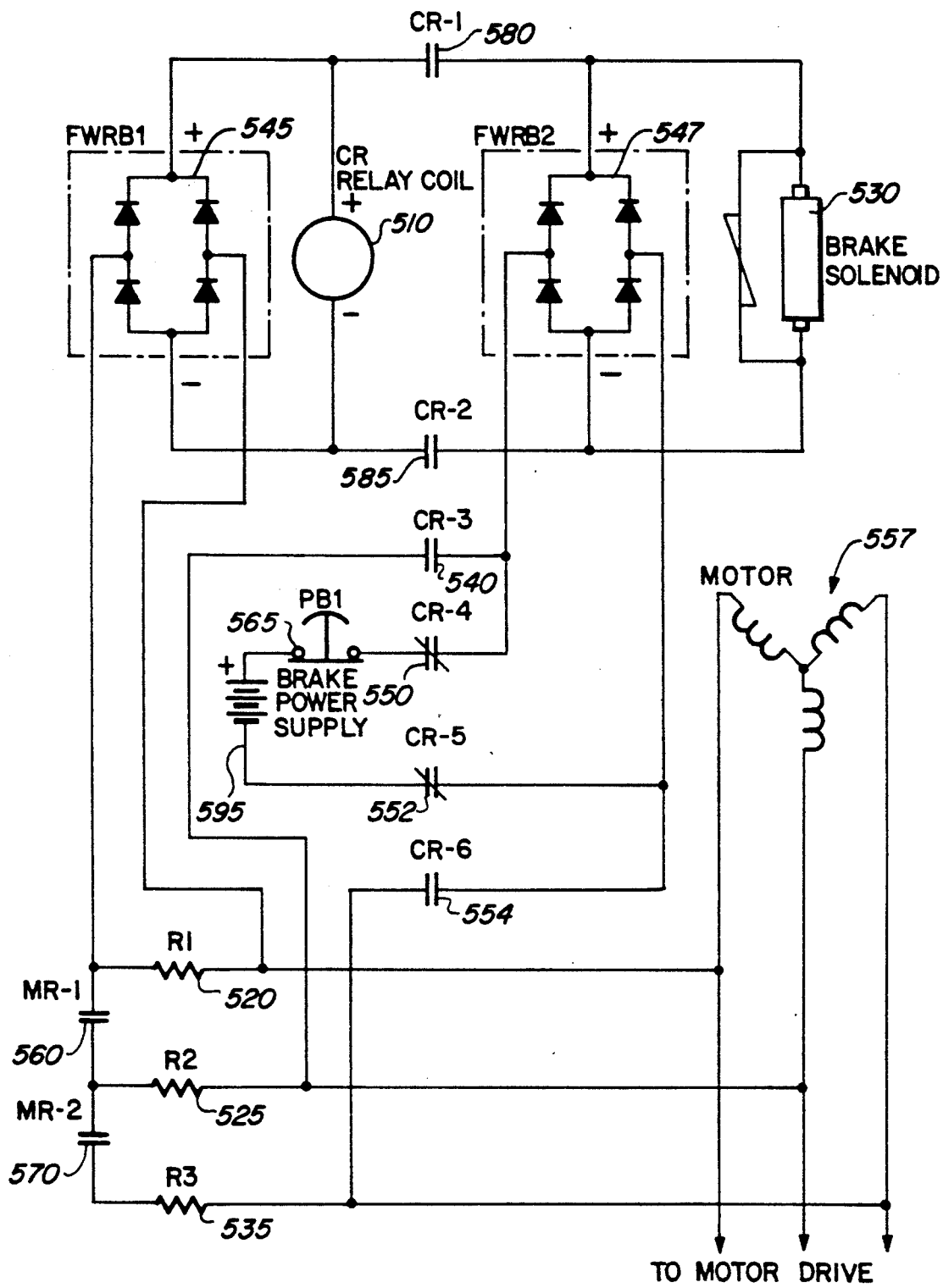
FIG. 5 is a schematic diagram illustrating the DBU3 circuit representing the second embodiment of the invention herein.

Turning now to FIG. 5, a second preferred embodiment of this invention, referred to as the DBU3 circuit, will be described. The DBU3 circuit, most importantly, adds a second full wave rectifier bridge 547 to the base DBU1 circuit. The second rectifier bridge 547 operates in three distinct modes with the original DBU1 rectifier 545 operating in two modes. With this combination of five modes between the two rectifiers 545 and 547 the DBU3 circuit is able to solve all three of the above mentioned problems with the DBU1 circuit.

In the normal operation of the system with the DBU3 circuit, when brake current is being supplied by the brake power supply 595, rectifier bridge 547 acts as a standard full wave bridge and outputs current to the mechanical brake solenoid 530 in a fixed polarity, regardless of how the polarity of the power supply 595 is connected to the circuit. Thus, the final problem described above, and not solved by the DBU2 circuit, is solved by the DBU3 circuit.

When an emergency stop occurs and the brake power supply 595 is cut off, bridge rectifier 547 functions automatically as an arc suppression diode and allows brake solenoid current to collapse through it (the bridge rectifier 547) rather than through the brake solenoid device 530 as it does in the DBU1 circuit. Since bridge rectifer 547 is a very low impedance device compared with the MOV of the brake solenoid 530, the time constant of the current collapse in the brake solenoid 530 is stretched out in time by a factor of ten or more. The magnetic field in the brake solenoid 530 is sustained so that no additional energy from the dynamic braking portion of the circuit is required to keep the mechanical brake disengaged.

When dynamic braking does occur, initially bridge rectifier 545 functions just as it does in the DBU1 circuit. However, when relay 510 energizes, one-half of rectifier bridge 545 and rectifier bridge 547 together form a 3 phase full wave rectifier bridge, which provides almost twice as much voltage across the brake solenoid 530 for a give motor rotational speed as in the DBU1 circuit. By more effectively capturing the dynamic brake energy during dynamic braking, premature engagement of the mechanical brake is prevented even at relatively slow speeds.

It can be seen from the above description of the braking circuits of this invention, that the peak (and most destructive) braking forces incident to the automatic tape library robot movement can be limited and precisely controlled by using only the dynamic electrical brake force when the robotic picker 10 is moving fast. The braking force can be controlled by adjusting the resistance values of resistors $R_1$ 320, 420, 520, $R_2$ 325, 425, 525 and $R_3$ 335, 435, 535. The mechanical brake force, which is not well controlled and can be damaging at high speeds, is employed only at low speeds. This prevents the high forces that can cause damage in the mechanical system, but applies braking action even when the robotic picker 10 is stopped or completely powered off.

It should also be noted that because the system embodying the current invention uses self generated power to perform braking, damage is prevented even when the emergency happens to be a power failure that occurs while the robotic picker 10 is in motion. Further, the system of the current invention is single fault tolerant. The robotic picker 10 will stop at a safe distance even when there is a single fault in one of the components. This includes any of the dynamic brake resistors $R_1$ 320, 420, 520, $R_2$ 235, 425, 525 and $R_3$ 335, 435, 535, the rectifier bridge 345, 445, 545, control relay CR 310, 410, 510 or the connecting wires. While mechanical damage due to overly severe braking could occur in the event of a failure, the circuit will still function properly with regard to braking ability.

While the invention has been described in its preferred embodiments, it is to be understood that the words which have been used are words of description rather than limitation and that changes within the purview of the appended claims may be made without departing from the true scope and spirit of the invention in its broader aspects.

Having thus described the invention, what is claimed as new and what is desired to be secured by Letters Patent is:

1. A dynamic braking circuit for an electric motor comprising:
   a mechanical brake power supply having first and second terminals;
   a first control relay having first, second, third and fourth movable contacts and a coil, said coil having first and second terminals;
   a brake solenoid having first and second terminals;
   a first resistor $R_f$ having a first terminal connected to said first movable contact of said first control relay and a second terminal;
   a first capacitor $C_f$ being connected in series with said first resistor and between said first resistor at its second terminal and said second movable contact of said first control relay;
   a second resistor $R_b$ being connected in parallel with said first capacitor $C_f$;
   said first movable contact of said first control relay being connected between said first terminal of said coil of said first control relay and said first terminal of said brake solenoid;
   said second movable contact of said first control relay being connected between said second terminal of said coil of said first control relay and said second terminal of said brake solenoid;
   said third movable contact of said first control relay being connected between said second terminal of said brake solenoid and one of said terminals of said brake power supply;
   said fourth movable contact of said first control relay being connected between said first terminal of said brake solenoid and the other of said terminals of said brake power supply;
   a rectifier bridge connected in parallel with said first relay coil;
   a third resistor having a first and second terminal and being connected in parallel with said rectifier bridge, said second terminal being further connected to said electric motor.

2. The braking control circuit of claim 1 wherein $C_f$ is 470 microfarads, $R_f$ is 100 ohms and $R_b$ is 10,000 ohms.

3. The braking control circuit of claim 1 further including a fourth resistor having a first terminal and second terminal, said second terminal connected to said electric motor, a fifth resistor having a first terminal and second terminal, said second terminal connected to said electric motor, and a second control relay having first and second movable contacts and a coil, said first movable contact between said first terminal of said third resistor and said first terminal of said fourth resistor and said second movable contact between said first terminal of said fourth resistor and said first terminal of said fifth resistor.

4. The braking control circuit of claim 1 wherein said electric motor is an AC motor.

5. The braking control circuit of claim 1 wherein said electric motor is a DC motor.

6. The braking control circuit of claim 1 wherein said mechanical brake power supply is disconnected from said circuit when an emergency power off button is depressed.

7. A dynamic braking circuit for an electric motor comprising:
   a mechanical brake power supply;
   a first control relay having first, second, third, fourth, fifth and sixth movable contacts and a coil, said coil having first and second terminals;
   a brake solenoid having first and second terminals;
   a first rectifier bridge connected in parallel with said first relay coil;
   a second rectifier bridge connected in parallel with said first brake solenoid;
   a first resistor having a first and second terminal, said first terminal being connected to said first rectifier bridge and said second terminal being further connected to said electric motor;
   a second resistor having a first and second terminal, said second terminal being connected to said electric motor;
   a third resistor having a first and second terminal, said second terminal being connected to said electric motor;
   said first movable contact of said first control relay being connected between said first terminal of said coil of said first control relay and said first terminal of said brake solenoid;
   said second movable contact of said first control relay being connected between said second terminal of said coil of said first control relay and said second terminal of said brake solenoid;
   said third movable contact of said first control relay being connected between said second rectifier bridge and said second terminal of said second resistor;
   said fourth movable contact of said first control relay being connected between said second rectifier bridge and a first teminal of said brake power supply;
   said fifth movable contact of said first control relay being connected between said second rectifier bridge and a second terminal of said brake power supply;
   said sixth movable contact of said first control relay being connected between said second rectifier bridge and a second terminal of said third resistor.

8. The circuit of claim 7 wherein said fourth and said fifth movable contacts of said first control relay are normally closed and said first, second, third and sixth movable contacts of said first control relay are normally open.

9. The braking control circuit of claim 7 further including a second control relay having first and second movable contacts and a coil, said first movable contact between said first terminal of said first resistor and said first terminal of said second resistor and said second movable contact between said first terminal of said second resistor and said first terminal of said third resistor.

10. A dynamic braking circuit for an electric motor comprising:
    a mechanical brake power supply having first and second terminals;
    a first control relay having first, second, third and fourth movable contacts and a coil, said coil having first and second terminals;
    a brake solenoid having first and second terminals;

a first resistor $R_t$ having a first terminal connected to said first movable contact of said first control relay and a second terminal;

a first capacitor $C_t$ being connected in series with said first resistor and between said first resistor at its second terminal and said second movable contact of said first control relay;

said first movable contact of said first control relay being connected between said first terminal of said coil of said first control relay and said first terminal of said brake solenoid;

said second movable contact of said first control relay being connected between said second terminal of said coil of said first control relay and said second terminal of said brake solenoid;

said third movable contact of said first control relay being connected between said second terminal of said brake solenoid and one of said terminals of said brake power supply;

said fourth movable contact of said first control relay being connected between said first terminal of said brake solenoid and the other of said terminals of said brake power supply;

a rectifier bridge connected in parallel with said first relay coil;

a third resistor having a first and second terminal and being connected in parallel with said rectifier bridge, said second terminal being further connected to said electric motor.

11. The braking control circuit of claim 10 wherein $C_t$ is 470 microfarads, $R_t$ is 100 ohms and $R_b$ is 10,000 ohms.

12. The braking control circuit of claim 10 further including a fourth resistor having a first terminal and second terminal, said second terminal connected to said electric motor, a fifth resistor having a first terminal and second terminal, said second terminal connected to said electric motor, and a second control relay having first and second movable contacts and a coil, said first movable contact between said first terminal of said third resistor and said first terminal of said fourth resistor and said second movable contact between said first terminal of said fourth resistor and said first terminal of said fifth resistor.

13. The braking control circuit of claim 10 wherein said electric motor is an AC motor.

14. The braking control circuit of claim 10 wherein said electric motor is a DC motor.

15. The braking control circuit of claim 10 wherein said mechanical brake power supply is disconnected from said circuit when an emergency power off button is depressed.

* * * * *